United States Patent [19]

Devanney

[11] 4,312,919
[45] Jan. 26, 1982

[54] PROCESS OF PRODUCING A NON-AGGLOMERATING VANADIUM COATED PARTICLE

[76] Inventor: John W. Devanney, 119 Rowayton Ave., Rowayton, Conn. 06853

[21] Appl. No.: 186,474

[22] Filed: Sep. 12, 1980

Related U.S. Application Data

[63] Continuation-in-part of Ser. No. 112,529, Jan. 16, 1980.

[51] Int. Cl.³ .......................... B32B 5/16; F23D 1/00; B09B 3/00; F24D 23/02
[52] U.S. Cl. .................................. 428/403; 110/347; 122/4 D; 428/404; 432/2
[58] Field of Search ........................... 432/2; 122/4 D; 110/347; 428/403, 404; 427/217

[56] References Cited

U.S. PATENT DOCUMENTS

| | | |
|---|---|---|
| 781,808 | 2/1905 | Carpenter . |
| 856,325 | 6/1907 | Becket . |
| 856,328 | 6/1907 | Becket . |
| 876,313 | 1/1908 | Becket . |
| 3,420,659 | 1/1969 | Rathmann et al. . |
| 3,807,090 | 4/1974 | Moss .................................. 122/4 D |
| 4,082,545 | 4/1978 | Malgarini et al. . |
| 4,085,707 | 4/1978 | Moss .................................. 122/4 D |
| 4,099,958 | 7/1978 | MacRae et al. . |

OTHER PUBLICATIONS

Brinser et al., The Society of Naval Architect's and Marine Engineers Transactions, vol. 85, 1977 pp. 271-299.

Primary Examiner—John J. Camby
Attorney, Agent, or Firm—Karl F. Milde, Jr.; Robert J. Eichelburg

[57] ABSTRACT

A process for the production of a non-agglomerating vanadium coated particle is disclosed comprising the combustion of a carbonaceous material or fuel containing relatively large amounts of vanadium in the presence of an oxidizing gas and a particulate substrate such as sand. The combustion of carbonaceous materials such as petroleum coke or bunker oil high in vanadium and sulfur produce vanadium products that melt at the combustion temperature and coat the firebox and/or heat exchange tubes in which the combustion process is conducted with corrosive vanadium slags. This coating problem is also avoided by the process disclosed.

19 Claims, 1 Drawing Figure

PROCESS OF PRODUCING A NON-AGGLOMERATING VANADIUM COATED PARTICLE

CROSS-REFERENCE TO RELATED APPLICATION

This application is a continuation-in-part of U.S. application Ser. No. 112,529, filed Jan. 16, 1980, of John W. Devanney, III.

BACKGROUND OF THE INVENTION

Petroleum products high in vanadium and sulfur have been used as boiler fuels, however, their combustion results in the deposition of vanadium products on the walls and/or heat exchange tubes within the boilers. The deposited vanadium compounds result in high temperature slag corrosion which is discussed in detail by Brinser et al., *The Society of Naval Architect's and Marine Engineers Transactions*, Volume 85, 1977 pp. 271-299. The high temperature corrosion of boilers is preceded by the formation of vanadium based slags on the interior of the boiler. A method of minimizing the formation of the vanadium based slags is to operate at combustion conditions that maximize the production of trivalent and tetravalent oxides of vanadium which have melting points of about 3,600° F. which is considerably higher than the combustion temperatures obtained in these boilers. Vanadium oxides that are in the higher oxidation state, e.g. pentavalent and septavalent oxides of vanadium and complexes thereof have melting points from about 1,200° to about 1,300° F. Formation of these compounds during combustion is to be avoided since they melt at or below the temperature range of the combustion process and will plate out or adhere to various critical boiler parts such as heat exchange tubing and the like. It is believed that the pentavalent and septavalent vanadium oxides adhere to the boiler surfaces and the sulfur by-products of the combustion process becomes entrained in the vanadium oxides along with other by-products of combustion thereby causing the formation of slag on the tube. As the slag increases in thickness, the temperature of the coating increases, destroys the protective oxide film on the boiler tubing, after which tube components are leached into the slag. The method employed by the prior art to minimize corrosion was to reduce the amount of air in the combustion process and thereby minimize the formation of the pentavalent and septavalent low melting oxides of vanadium while maximizing the high melting trivalent and tetravalent oxides of vanadium. In any event, the prior art method of reducing the air/fuel ratio did not substantially eliminate vanadium corrosion.

The present invention obviates this and other difficulties of the prior art by removing the vanadium as a coating on a particulate substrate such as silica. The coating is preferably formed during combustion on a substrate suspended as a fluidized bed and in the presence of an oxidizing gas used to support the bed. The process has the dual advantage of producing a particle that does not agglomerate and further results in the substantially complete capture of the vanadium thereby preventing it from plating out on any of the boiler parts. This phenomenon occurs even when high air fuel ratios are used which, according to the prior art tended to produce low melting oxides of vanadium and complexes thereof that would lead one to predict that agglomeration and plating would occur followed by vanadium corrosion of critical boiler parts.

The prior art U.S. Pat. Nos. to Carpenter, 781,808; Becket, 856,325 and 856,328 and 876,313; Rathmann et al., 3,420,659 and Macrae et al., 4,099,958 describe various methods for the production of vanadium and its alloys. Rathmann et al. disclose a process of treating vanadium-bearing slags with silica, flux and a carbonaceous reducing agent by smelting to produce a primary vanadium silicide having 25-60% silicon. The primary silicide is refined with lime and a vanadium-bearing slag or a vanadium oxide to produce a vanadium alloy having a silicon content less than 20%. The prior art also discloses fluidized bed processes such as the U.S. Pat. to Malgarini et al., 4,082,545.

None of these prior art references disclose a process for producing a non-agglomerating vanadium coated particle by the combustion of a carbonaceous material containing relatively high amounts of vanadium as an impurity in an oxidizing gas.

Accordingly it is an object of the present invention to overcome these and other difficulties encountered in the prior art.

It is a further object of the present invention to provide a novel process for producing a non-agglomerating vanadium coated particle. It is a further object of the present invention to provide a process for eliminating or substantially eliminating the coating of a fire box or boiler with vanadium when burning a carbonaceous material or fuel high in vanadium and high in vanadium and sulfur such as petroleum coke, bunker oil and other petroleum products.

It is also an object of the present invention to provide a process for burning carbonaceous materials such as petroleum coke, bunker oil and other petroleum products high in vanadium or high in vanadium and sulfur with relatively large excesses of an oxygen containing gas with the substantial to complete elimination of vanadium build-ups or coatings within the firebox or boiler in which such combustion process is conducted.

These and other objects have been achieved according to the method of the present invention which will be understood more completely by reference to the appended claims, drawings and the following disclosure.

SUMMARY OF THE INVENTION

The present invention comprises a process of producing a non-agglomerating vanadium coated particle comprising the combustion of a carbonaceous material containing from up to about 5000 PPM vanadium in the presence of an oxidizing gas, the combustion being conducted in the presence of a particulate substrate whereby the vanadium is coated onto the substrate. The carbonaceous material may comprise a petroleum product such as petroleum coke, bunker oil or the lighter fractions of petroleum which are liquid at room temperature (15°-20° C.). Petroleum coke containing up to about 2,000 PPM vanadium or from less than one to about 1,500 PPM vanadium may also be used. The expression "up to" is intended to mean any measurable amount of vanadium less than the upper limits of this range.

The particulate substrate in one embodiment is selected from at least one member of the group consisting of silica, alumina, calcium carbonate, magnesite and all of the various art known equivalents thereof. In one embodiment silica in the form of sand is used as the substrate.

The process in one preferred embodiment is carried out on a fluidized bed of the substrate so that the substrate is supported on the oxidizing gas, and bringing the carbonaceous material into the fluidized bed. The continuous combustion of the material and continuous replenishment of the bed is also within the scope of the invention.

The particulate substrate may have a particle size of from about 5 to about 40 mesh (A.S.M.E. 11).

The combustion may be conducted at temperatures of from up to about 2,500° F. Temperatures up to about 2,000° F. or from about 1,200° to about 2,500° F. or 1,200° to about 2,000° F. may also be used. The expression "up to" is intended to include any lower temperature at which combustion takes place.

In another embodiment of the invention, a process is provided for preventing metal heat exchange tubes immersed in a firebox from being coated with vanadium from a petroleum fuel high in vanadium or high in vanadium and sulphur comprising the combustion of the petroleum fuel in the presence of an oxidizing gas and a particulate substrate in a firebox having a fluidized bed of the substrate supported on the gas. The metal heat exchange tubes may be positioned adjacent the bed i.e., either above or immersed in the bed. The vanadium in the fuel differentially forms a non-agglomerating coating of vanadium on the substrate and does not coat the metal heat exchange tubes. This aspect of the process is applicable to any type of boiler and any type of heat exchange tube where vanadium deposits present a problem.

The invention also relates to the product formed by any one of the foregoing processes. In another aspect of the invention, a method is provided for the recovery of vanadium in carbonaceous materials such as petroleum coke, bunker oil or other petroleum products that are relatively high in vanadium or vanadium and sulfur. The vanadium, removed from the fuel by the coating of particulate material with the vanadium, can be recovered as metallic vanadium using art known methods for refining vanadium bearing slags or vanadium ores. In this repsect, a process has been discovered for the selective removal of vanadium in relatively high concentrations from carbonaceous fuels such as petroleum coke containing up to about 5000 PPM vanadium. The coated particulate materials thus obtained can be considered as a vanadium ore and represents an especially significant contribution for obtaining recoverable amounts of metallic vanadium from raw materials containing up to about five thousand parts per million of vanadium.

DESCRIPTION OF THE SEVERAL EMBODIMENTS

Figure 1:
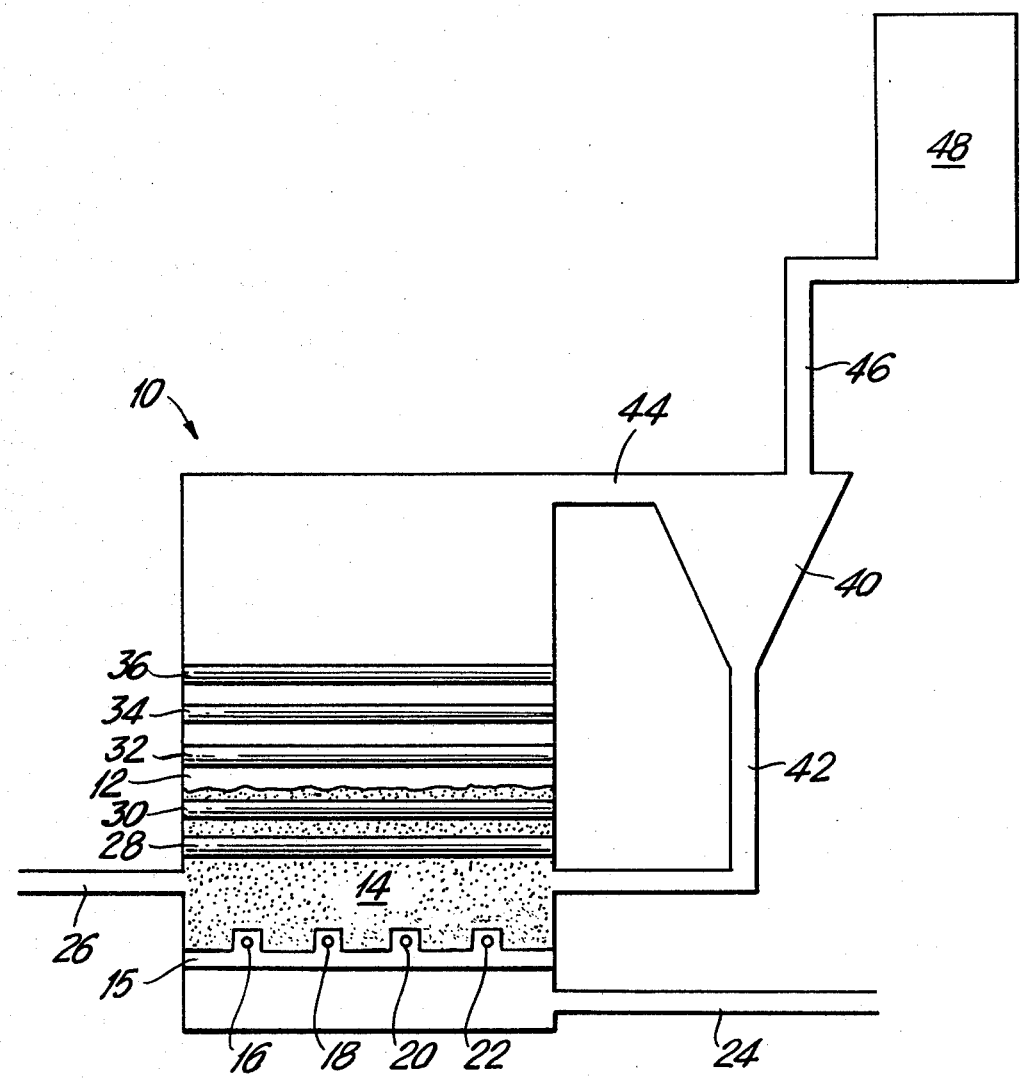
FIG. 1 comprises a schematic view of a fluidized bed for burning carbonaceous materials high in vanadium or vanadium and sulfur such as petroleum coke and bunker oil according to one embodiment of the invention.

Referring to FIG. 1, apparatus 10 is illustrated comprising a firebox 12 having a fluidized bed 14 therein which is supported by an oxidizing gas such as air which enters the apparatus 10 through a conduit 24.

Bed 14 comprises a bed of a particulate substrate selected from at least one member of the group consisting of silica, aluminum, calcium carbonate, magnesite and the art known equivalents thereof. In the embodiments that are subsequently described herein, silica is employed as the bed material or the particulate substrate.

A plate 15 is positioned beneath bed 14 and has a series of nozzles 16, 18, 20 and 22 with openings therein or directing the oxidizing gas at the bed 14 and in such a manner to support bed 14 in a fluidized condition. A conduit 26 is employed for continuously introducing carbonaceous material into the bed or for replenishing the particulate substrate. A series of heat exchange tubes 28, 30, 32, 34, and 36 are positioned above and within the bed 14 for extracting the heat generated within the bed during the course of the process of the invention. Each of the heat exchange tubes is hollow and extends into and out of the bed from a manifold (not illustrated).

The plate 15 is fabricated from carbon steel and the heat exchange tubes 28, 32 and 36 are fabricated from ASME code approved boiler grade materials including type T22 (2¼ CR/1Mo) T11 (1¼CR/½Mo) A192 carbon steel and Sandvik free RE60 (18 CR/5NI) an extra low carbon stainless steel with a duplex structure consisting of 50% ferrite and 50% austenite. Tubes were also fabricated from austenitic stainless steel alloys including AISI types 304, 316, 321, 347 and 309 with silicon, nitrogen, and rare earth metals added (Sandvik 253Ma) and Sancro 31H which is equivalent to Huntington alloy 800H. Sandvik 12R72. (15CR/15NI) was also used.

A cyclone separator 40 is connected to the top of the firebox 12 by means of pipe 44 whereas the bottom of the cyclone 40 terminates in a dip-leg 42 for the return of separated particulate substrate and other materials into the bed 14. Materials having a relatively low mass are not separated by the cyclone 40 and are carried along with flue gas through conduit 46 into a filtering mechanism 48 such as a bag house filtering arrangement which is well known in the art.

The apparatus of FIG. 1 was used for conducting several tests using a high purity silica sand bed (12–30 mesh A.S.T.M.E. 11) and a petroleum coke or a coke sometimes referred to in the art as a delayed coke having a vanadium content of approximately 450 PPM. The combustor or firebox conditions were controlled to produce bed temperatures between 1,500° F. and 1,600° F. superficial velocities between about 7.5 feet/second to about 10 feet/second and excess air levels between 12 and 50%.

Combustion efficiencies measured during the test program ranged between 70 and 90%, the recycle rate was estimated to be between 1,000 and 1,500 PPH. The solids recycle stream consists substantially of bed fines and unburned fuel. The elutriation of bed fines was estimated to be about 2% per hour.

The tests were run in an 18 inch by 18 inch combustor in plan view generating 1 million B.T.U.'s/hour.

The combustor is an atmospheric fluidized bed, refractory lined to an active fluidizing area of 2.25 square feet. The mild steel shell comprising the outer wall is protected by a three inch lining of high duty fireclay brick and two inches of block insulation. The combustor is operated with a bed depth of 30–40 inches which allows for a freeboard height of approximately 6 to about 7 feet.

EXAMPLES

Air flow fluidization-combustion is supplied by a centrifugal forced draft blower to the combustor described above where the rate is manually adjusted by a butterfly valve and metered by an orifice plate. Superficial velocities of between about 7.5 to about 10.5 ft./sec. are employed. The dipleg 42 for the return of the particulate matter from the fluidized bed is at a point about 15 inches above the plate 15. The flue gas entering into the baghouse 48 by pipe 46 is cooled with a conventional or art known heat exchanger (not illustrated) so that the gas is cooled to approximately 350° F. before entering baghouse 48.

The draft in the freeboard section of the firebox 12 is controlled to 5–10 inches W.C. by an induced draft fan with a regulating control valve (not illustrated).

Petroleum coke having 450 PPM vanadium was employed in the experiment and was air dried to a moisture level of about 4 to about 5 percent, crushed to about less than about 4 mesh and transferred pneumatically to a feed hopper (not illustrated) from which it was conveyed by a volumetric screw feeder (not illustrated) to a rotary air lock (not illustrated) and then pneumatically to the combustor through conduit 26.

The bed temperature is controlled by adjusting the coke feed rate in response to variations in temperature by means of devices well known in the art such as a thermocouple inserted into the bed 14 which is used to provide a feed rate adjustment signal transmitted to a proportional integral derivative (PID) controller which adjusts the speed of the screw in the volumetric feeder.

Flue gas samples are drawn from a port on the flue gas pipe 46 downstream of the cyclone and from a port downstream of the heat exchanger used to cool the flue gas before entering the baghouse. In each case the sample is drawn through a sintered stainless steel probe after which it is condensed, dried and filtered to remove particulates before being introduced into gas analyzers which are operatively connected to recorders to continuously monitor the output of each analyzer. The gas is tested for carbon dioxide, sulfur dioxide, oxygen, carbon monoxide and the various oxides of nitrogen.

The test program was initiated by raising the bed temperature to approximately 1,000° F. by the use of a gas fired bed burner (not illustrated) positioned above the bed. When this temperature is reached, the coke feed was started and the bed temperature increased by increasing the solid fuel weight and decreasing the burner gas flow until a bed temperature near 1,500° F. was achieved. At this first temperature, the ignition burner was shut down and the automatic feed circuit activated to control the bed temperature. Coke, bed ash and flyash (baghouse ash) samples were taken regularly throughout the test procedure.

Combustion efficiency was measured using two independent methods. The first method used the ignition loss of bag-house (fly ash) samples as a measure of unreacted carbon. The combustion efficiency calculated using this method is based on the percentage of the coke heating value lost in the elutriated ash and flue gas combustibles. This is given by the following expression.

$$CE (\%) = \frac{100 \left[ \overset{\circ}{M}_{coke} \Delta H_{coke} - \overset{\circ}{M}_{ash} X_C \Delta H_C - \frac{28}{29} \overset{\circ}{M}_{gas} X_{CO} \Delta H_{CO} \right]}{\overset{\circ}{M}_{coke} \Delta H_{coke}}$$

| | |
|---|---|
| $\overset{\circ}{M}_{coke}$ | coke feed rate, lb/hr |
| $\Delta H_{coke}$ | coke heating value, Btu/lb |
| $\overset{\circ}{M}_{ash}$ | ash collection rate, lb/hr |
| $X_C$ | carbon mass fraction, lb/lb |
| $\Delta H_C$ | carbon heating value, Btu/lb |
| $\overset{\circ}{M}_{gas}$ | flue gas flow rate, lb/hr |
| $X_{CO}$ | CO volume fraction |
| $\Delta H_{CO}$ | CO heating value, Btu/lb |

The second method used the stoichiometric air/fuel ratio calculated using the ultimate analysis of the coke, total air supplied to the combustor, and the measured excess air level to determine the amount of coke burned. A measure of combustion efficiency is obtained by comparing the amount of coke burned to the amount fed.

Data was collected over a 17 hour period from one run, the operating conditions and results of which are reported in table 1.

TABLE 1.

| Data Time | Fuel type | Fuel Moisture % | Fuel Htg. Value Btu/lb | Coke Feed Rate PPH | Bed Temp. °F. | Free-Board Temp. °F. | O₂ % | CO₂ % | CO % | SO₂ PPM |
|---|---|---|---|---|---|---|---|---|---|---|
| 1:53 | Pet. Coke | 4.2 | 14970 | 113.0 | 1603 | 1629 | 5.0 | 16.1 | 0.0 | 2090 |
| 4:52 | Pet. Coke | " | " | 123.0 | 1544 | 1576 | 4.5 | 15.4 | 0.0 | 2000 |
| 6:30 | Pet. Coke | " | " | 123.5 | 1579 | 1608 | 3.5 | 14.8 | 0.0 | 2040 |
| 8:30 | Pet. Coke | " | " | 131.7 | 1563 | 1596 | 3.2 | 15.1 | 0.0 | 2040 |
| 10:30 | Pet. Coke | " | " | 120.3 | 1541 | 1570 | 4.0 | 14.9 | 0.0 | 2010 |
| 12:30 | Pet. Coke | " | " | 126.0 | 1573 | 1607 | 4.9 | 13.7 | 0.0 | 1580 |
| 14:30 | Pet. Coke | " | " | 126.8 | 1506 | 1561 | 4.8 | 13.4 | 0.0 | 1530 |
| 16:30 | Pet. Coke | " | " | 139.8 | 1584 | 1626 | 4.5 | 13.4 | 0.0 | 1500 |
| 19:30 | Pet. Coke | " | " | 124.3 | 1538 | 1628 | 4.5 | 14.4 | 0.0 | 1670 |

| Data Time | Super. Vel. ft/sec | Bed Hgt. in. | Flue Gas PPH | In-Bed HX Flow PPH | Excess Air % | Comb. Eff. % | Heat Bal. % | Ash Rate pph | Unburned Carbon |
|---|---|---|---|---|---|---|---|---|---|
| 1:53 | 9.5 | 40.0 | 1601 | 6268 | 31.6 | 89 | 89 | 14 | 82 |

TABLE 1.-continued

| | | | | | | | | | |
|---|---|---|---|---|---|---|---|---|---|
| 4:52 | 9.0 | 40.0 | 1571 | 8979 | 27.6 | 82 | 99 | 12 | 84 |
| 6:30 | 9.3 | 39.2 | 1590 | 8958 | 20.2 | 87 | 91 | 18 | 67 |
| 8:30 | 8.6 | 39.0 | 1493 | 9286 | 18.2 | 78 | 95 | 8 | 17 |
| 10:30 | 8.6 | 37.5 | 1497 | 8943 | 23.8 | 82 | 94 | 8 | 19 |
| 12:30 | 9.5 | 37.0 | 1628 | 8915 | 30.8 | 81 | 96 | 13 | 14 |
| 14:30 | 8.8 | 35.0 | 1571 | 9015 | 30.0 | 78 | 95 | 18 | 5 |
| 16:30 | 8.8 | 31.0 | 1522 | 8917 | 27.6 | 69 | 98 | 16 | 3 |
| 19:30 | 8.5 | 27.6 | 1497 | 8893 | 27.6 | 77 | 97 | 18 | 3 |

The overall solids mass balance for the run showed that 223 pounds of bed materials (42%) was elutriated and collected in the baghouse. This was determined as the difference between the initial and final weight of the bed. The bed depth initially at 40 inches decreased to approximately 28 inches by the end of the test. The amount of carbon collected in the baghouse, 334 pounds, was determined from the weight and the carbon content of the ash collected during the test. The total weight of material, ash plus unburned carbon, 557 pounds, agrees within two percent of the total weight of material actually collected, 548 pounds and shows essentially that all material had been accounted for.

Combustion efficiencies were measured and are believed to be affected by bed depth, more so than any other factor.

After firing for 48 hours, analyses of the bed material and the baghouse material by microscopic examination, x-ray diffraction analysis, scanning electron microscope and electron probe indicate that when quartz sand is used as the bed material in the fluidized bed burning of the petroleum coke, the impurities in the coke form a solid crystalline product on the quartz surfaces and are thereby trapped in the fluid bed. Substantially all of the vanadium in the petroleum coke is captured by the quartz surface and unexpectedly large quantities of sulfur are also trapped as a solid material. The surface phases which increase in thickness with time are compounds of vanadium, sulfur, iron, calcium and aluminum with other minor elements included in the crystal structures. During the burning, a black material is produced that is collected in the baghouse along with fine particles of quartz having the same coating material on it as the quartz material in the bed i.e., a crystalline compound of vanadium, sulfur, iron calcium and aluminum with other minor elements in the crystal structure. The black material found in the baghouse is a grainy, opaque material containing a considerable amount of a glassy product and major amounts of carbon and sulfur, and lesser amounts of vanadium. About 70% of the material recovered in the baghouse comprises the aforementioned silica having the solid crystalline product on the surface and the balance of about 30% is made up of the black material containing the glassy product having major amounts of carbon and sulfur and smaller amounts of vanadium.

Microscopic examination of the original bed material indicated that the material was well rounded quartz grains with an average particle size of one millimeter. Less than 5% of other phases were present. These other phases included some feldspar grains and some small amounts of magnetic opaque material which are presumed to be metal particles from processing operations that the silica is subjected to prior to use in the fluidized bed process of the present invention.

Microscopic examination of the quartz after firing with petroleum coke indicates that a reaction product forms on the surface of the quartz comprising isolated nucleii and as firing time increases both the number and size of these nucleii also increase. These nucleii may be formed by condensation as a liquid and crystallized when the bed cools or it may crystallyze directly from the vapor. It is doubtful that the condensation mechanism explains the formation of the nucleii since it would be expected that agglomeration of the individual coated quartz particles would result and this phenomenon is not observed.

There is no optical evidence for any diffusion into the quartz of either the coating or any elements of the coating. The phase or phases deposited on the surface build in thickness by coalescence of the growing nucleii until at about 48 hours, the bed material shows a surface layer or coating which is about 10 microns thick.

As the firing time increases, the average quartz particle size decreases. This is due to the fracture of the colliding grains in the fluid bed. When a particle of quartz or flyash becomes small enougn, it is blown into the baghouse. Each fracture of quartz material in the fluid bed results in a fresh uncoated surface that is available for a subsequent deposition of reaction product in the fluid bed.

Miroscopic examination of the baghouse fines show some fine quartz grains and the black material which appears to be a carbon rich crystalline phase embedded in a glassy matrix.

X-ray diffraction analysis was used to determine the compound or compounds formed on the surface of the quartz grains. The unused quartz bed material is mostly alpha quartz with about 4% feldspar grains and lesser amounts (i.e. about 1%) of unidentified components. When fired in coal only, no new phases are found on the quartz. Firing the petroleum coke with the quartz produced at least 2 new quartz phases. About 30% beta quartz is observed and disappears upon prolonged firing with petroleum coke. A series of diffuse peaks begin to appear after six hours and grow in intensity with firing time. This series always has a peak at an X-ray angle corresponding to a crystalline material with lattice planes spaced at 6.50 Angstroms. A survey of compounds which have peaks in this region is listed below. Probably more than one of these phases exists on the surface.

| | |
|---|---|
| $VOOH$ | $Na_6, V_{10}, O_{28}, 26H_2O$ |
| $NaV_3, O_8$ | $V_2(SO_4)_3, H_2O$ |
| $V_2, O_4, 2H_2O$ | $K_3, V(CN)_5, NO, 5H_2O$ |
| $FeSiO_3$ | $(VO_2)_2, S_2, O_7$ |
| $Na_8, V_{24}, O_{63}$ | $Ca(VO)Si_4O_{10}, 6H_2O$ |
| $NaVO_3$ | $Fe_4(VO_4)_4, 5H_2O$ |
| $V_2, S_4, O_{17}, 3H_2O$ | $S^7Na_2O, 12(V_2O_4—V_2O_5)$ |

The X-ray diffraction analysis of the baghouse material shows the presence of alpha quartz. Although the vanadium-sulfur phase is present on the quartz surfaces, the peaks for the vanadium sulfur phase are not detected because of the large amount of black material which is in the amorphous phase and which is mixed in with the quartz sample which was subjected to X-ray diffraction. This amorphous phase masks the low intensity peaks which would indicate the presence of vanadium-sulfur coatings on the quartz particle in this aspect of the X-ray diffraction analysis. No evidence was observed for the formation of a liquid phase in the quartz surfaces by X-ray diffraction analyses.

X-ray diffraction analysis indicates the black material comprises a glassy opaque phase which contains carbon, sulfur, lesser amounts of vanadium, possibly some siliceous material. Some unidentified phases present in concentrations of less that five percent were detected by X-ray diffraction.

Quartz grains were studied with a scanning electron microscope and while original grains are rounded, high magnification reveals an extremely irregular and pitted surface after firing in the fluidized bed process of the present invention. Examination of quartz grains which have a surface deposit shows some rounded units but it is difficult to separate original surface features from growth features.

Grains of bed material were mounted and chemically analyzed by electron probe technique. The excited X-radiation produced by this method was analyzed by passing the radiation through a lithium fluoride crystal, a PET crystal and a quartz crystal. All samples were examined for vanadium by focusing the beam on the surface of the grains. There is some irradiation of the quartz grains below the surface which tends to reduce the observed values.

Qualitatively, all quartz grains both from the bed and the baghouse show the vanadium present after firing. Quantitative analyses were made by comparing peak heights with standards. The results indicate that the bed material, after examining eight grains of quartz contained on the average of 1.88 weight percent, the maximum vanadium found in the sample being 3.52 weight percent. Certain grains were sectioned and the interior was examined for vanadium but none showed levels greater than 0.01 weight percent. The sectioned grains indicate a surface coating which is about 5 microns thick after 16 hours and about 15 microns thick after 48 hours. The silica material in the baghouse contained the same amounts of vanadium as the silica from the bed.

The quartz fluidized bed material and the black material obtained from the baghouse were scanned by the aforementioned electron probe analysis method for a complete elemental analysis. The probe cannot detect elements lighter than fluorine i.e. hydrogen, helium, lithium, berylium, boron, carbon, nitrogen and oxygen. The analysis of the quartz material in the bed by this method indicated the presence of major elements comprising silicon, vanadium, calcium, aluminum, sulfur and iron. The minor elements found in the bed material comprise nickel, sodium and potassium whereas traces of phosphorous and zinc were also detected. The black material showed sulfur as the major component, minor amounts of vanadium and no trace elements. The silicon and aluminum in the bed material are most likely from the underlying quartz. The balance of the materials found on the bed material were deposited on the surface. Quantative analyses by the electron probe method indicated that the bed material contained 2.01 plus or minus 0.21 weight percent of sulfur from the examination of 6 grains of bed material, the highest concentration found being 5.70 plus or minus 0.47 weight percent of sulfur. The black material contained on the average 4.47 plus or minus 0.11 weight percent sulfur from the examination of 6 grains of flyash material the highest amount of sulfur being 5.43 plus or minus 0.07 weight percent. Iron concentration in the silicon bed material on the average comprised 9.75 plus or minus 0.50 weight percent upon the examination of 4 grains, the highest amount being 13.9 plus or minus 0.90 weight percent iron. Iron was not detected in an examination of 10 grains of the black material obtained from the baghouse. The foregoing concentrations of material on the bed quartz are surface concentrations and not the overall weight percent of the grain examined.

During the runs of 48 and 60 hours no vanadium deposits or build-up on the metal boiler tubes is observed even though 20–30% excess air is employed in the process. Neither slag, nor vanadium metal or oxides or mixtures of vanadium metal or oxides with sulfur or other elements in the fuel are found on the heat exchange tubes. The data of table 1 indicate that when the process is conducted utilizing between 20 to 30% excess air, vanadium build-up on the heat exchange tubes or slag build-ups or corrosion of the heat exchange tubes should occur in view of the data in the Brinser et al. article (Supra). This article teaches that slags develop with 3% excess air and contain a ratio of vanadium pentoxide (M.P. 1247°, 1274° F.) to vanadium trioxide/-tetraoxide, (both having a melting point of 3578° F.) of about 0.5 whereas slags develop with 10% excess air contain a ratio of about 9.0. From these data, it would be expected that large quantities of excess air as employed by the present invention, would produce the lower melting oxides of vanadium melting at about 1,250° F. and would be liquid at the 1,500° F. bed temperature causing the bed particles to agglomerate. Agglomeration did not occur nor did any coating of vanadium or vanadium and other elements appear on the surface of the metal heat exchange tubes immersed in and over the bed. These results are totally unanticipated and unpredictable from the prior art.

Thus it has been discovered that vanadium and sulphur can be extracted from vanadium bearing fuels. The fluid bed combustion is conducted using a wide variety of bed materials including ordinary sand. The extraction is obtained by deposition of a substance containing the vanadium on the surface of the bed material. Flyash is also produced in the process. Surprisingly this process is dry in the sense that no agglomeration of the bed material occurs either during the operation of the bed nor upon cool down. Additionally, metal heat exchange tubes inserted in or above the bed are not coated with either the vanadium or a slag based on vanadium and other by-products of the combustion of the fuel. Prior to this discovery, the melting of the vanadium-sulfur complex in the fuel at the bed operating temperatures (about 1,500° F.) would have been expected, but the fact that this melting is not observed and there is no bed material agglomeration could not have been predicted.

In the tests conducted, grains of bed material were produced in which the surface layer contains vanadium and sulfur up to about 15 microns thick as measured by electron probe. The surface material had average concentrations of vanadium from about 0.5 to about 2% and concentrations as high as about 3.5% have been observed also by electron probe. No build-up of vanadium on heat transfer tubes immersed in or above the bed has been observed despite the fact that these tubes were operating over a full range of steam generator metal temperatures (500° up to 1,400°). Material balance on total vanadium by emission spectroscopy confirm that essentially all the vanadium is ending up on the bed material and in the baghouse materials. The plating out effect is differentially directed toward the bed material rather than the heat transfer tubes with elimination of vanadium-related corrosion of the latter. This differential effect would have been very difficult to anticipate.

With time, the bed material is broken up into smaller size particles eventually reaching a size small enough to be carried out of the firebox in the flue gas train from which it can be recovered by a downstream device such as a baghouse. By employing this process baghouse material containing better than 6,900 PPM vanadium from the fuel containing 620 PPM vanadium (both measurements by emission spectroscopy) have been produced. Between about two to about six average weight percent of sulfur has been observed in the surface layers using a 3 to about 5 percent sulfur fuel. The sulfur in the surface layer represents less than about 5 percent of all the sulfur burned and is a useful means of capturing sulfur whereas the process whereby silica coated with vanadium is obtained is a useful method for capturing vanadium from the fuel material.

The baghouse silica as well as the bed silica, both of which have vanadium coatings, can be further processed to recover vanadium in another aspect of this invention. The vanadium may be extracted by methods well known in the art. The conditions of the process of the present invention may also be adjusted so as to further increase the amount of sulfur recovered which is useful as a method for not only recovering sulfur but also for reducing air pollution. As the process is now disclosed, it also provides a method for recovering sulfur and also reducing air pollution when burning a sulfurous fuel.

Although the invention has been described by reference to some of the embodiments, it is not intended that the novel process or the product produced by this process be limited thereby and that modifications thereof are intended to be included as following within in the broad spirit and scope of the aforegoing disclosure, the following claims and the appended drawing.

What is claimed is:

1. The process of producing a non-agglomerating vanadium coated particle comprising carrying out the combustion of a carbonaceous material containing from up to about 5,000 PPM vanadium in the presence of an oxidizing gas, said combustion also being conducted in the presence of a particulate substrate selected from a member of the group consisting of silica and magnesite whereby said vanadium is coated onto said particulate substrate.

2. The process of claim 1 wherein said carbonaceous material comprises a petroleum product.

3. The process of claim 2 where said petroleum product comprises petroleum coke.

4. The process of claim 2 where said petroleum product comprises bunker oil.

5. The process of claim 1 where said substrate comprises silica.

6. The process of claim 1 where said process is carried out on a fluidized bed of said substrate supported on said oxidizing gas, and bringing said carbonaceous material into said fluidized bed.

7. The process of claim 6 where said particulate material has a particle size of from about 5 to about 40 mesh.

8. The process of claim 6 where said combustion is conducted as temperatures up to about 2,500° F.

9. A product produced by the process of claim 1.

10. A product produced by the process of claim 2.

11. A product produced by the process of claim 3.

12. A product produced by the process of claim 4.

13. A product produced by the process of claim 5.

14. A process for preventing metal heat exchange tubes immersed in a firebox from being coated with vanadium from a petroleum fuel high in vanadium comprising carrying out the combustion of said petroleum fuel in the presence of an oxidizing gas and a particulate substrate selected from a member of the group consisting of silica and magnesite in a firebox having a fluidized bed of said substrate supported on said gas, said metal heat exchange tubes being positioned adjacent said bed, the vanadium in said fuel differentially forming a non-agglomerating coating of vanadium on said substrate.

15. The process of claim 14 where said petroleum fuel comprises petroleum coke.

16. The process of claim 14 where said petroleum fuel comprises bunker oil.

17. The process of claim 14 where said substrate comprises silica.

18. The process of claim 14 where said particulate substrate has a particle size of from about 5 to about 40 mesh.

19. The process of claim 14 where said combustion is conducted at temperatures up to about 2,500° F.

* * * * *